United States Patent [19]

Komiyama et al.

[11] Patent Number: 5,262,105
[45] Date of Patent: Nov. 16, 1993

[54] METHOD FOR MOLDING HOLLOW SHAPED BODIES

[75] Inventors: Chiaki Komiyama; Akiyoshi Nagano, both of Aichi; Sadao Nada, Inazawa; Hiroshi Mukai, Hashima; Hidetaka Fukamachi, Komaki; Hirohisa Narukawa; Akihiro Yoshida, both of Inazawa, all of Japan

[73] Assignee: Toyoda Gosei Co., Ltd., Nishikasugai, Japan

[21] Appl. No.: 647,668

[22] Filed: Jan. 29, 1991

[30] Foreign Application Priority Data

Jan. 30, 1990 [JP] Japan .................. 2-19702
Mar. 8, 1990 [JP] Japan .................. 2-57755

[51] Int. Cl.⁵ ............... B29C 45/16; B29C 49/20; B29D 22/00; B32B 31/00
[52] U.S. Cl. ....................... 264/85; 264/209.1; 264/259; 264/328.7; 264/328.8; 264/328.12; 264/328.13; 264/513; 264/516; 264/572
[58] Field of Search .............. 264/85, 209.1, 259, 264/328.7, 328.8, 328.12, 328.13, 510, 512, 513, 516, 572

[56] References Cited

U.S. PATENT DOCUMENTS

| | | | |
|---|---|---|---|
| 4,101,617 | 7/1978 | Friederich | 264/572 |
| 4,136,220 | 1/1979 | Olabisi | 264/572 X |
| 4,619,847 | 10/1986 | Jackson | 428/31 |
| 4,719,067 | 1/1988 | Thiel | 264/259 |
| 4,968,474 | 11/1990 | Ito | 264/513 |
| 5,069,859 | 12/1991 | Loren | 264/572 |
| 5,098,637 | 3/1992 | Hendry | 264/572 |

FOREIGN PATENT DOCUMENTS

| | | | |
|---|---|---|---|
| 54-15291 | 6/1979 | Japan . | |
| 57-14968 | 3/1982 | Japan | 264/572 |

Primary Examiner—Leo B. Tentoni
Attorney, Agent, or Firm—Cushman, Darby & Cushman

[57] ABSTRACT

Molding a hollow shaped body which has a skin made of a synthetic resin and a hollow portion therein by a mold block provided with a mold cavity in the shape of the hollow shaped body, a tub into which an excess amount of the synthetic resin can flow and a small flow path communicating between the mold cavity and the tub. The process includes forming the skin of the hollow shaped body by injecting a molten synthetic resin into the mold cavity to fill up the cavity. Thereafter, a gas is introduced into the injected synthetic resin to thereby form the hollow portion. The gas injection forces a part of the synthetic resin out of the mold cavity and into the tub through the small flow path.

8 Claims, 14 Drawing Sheets

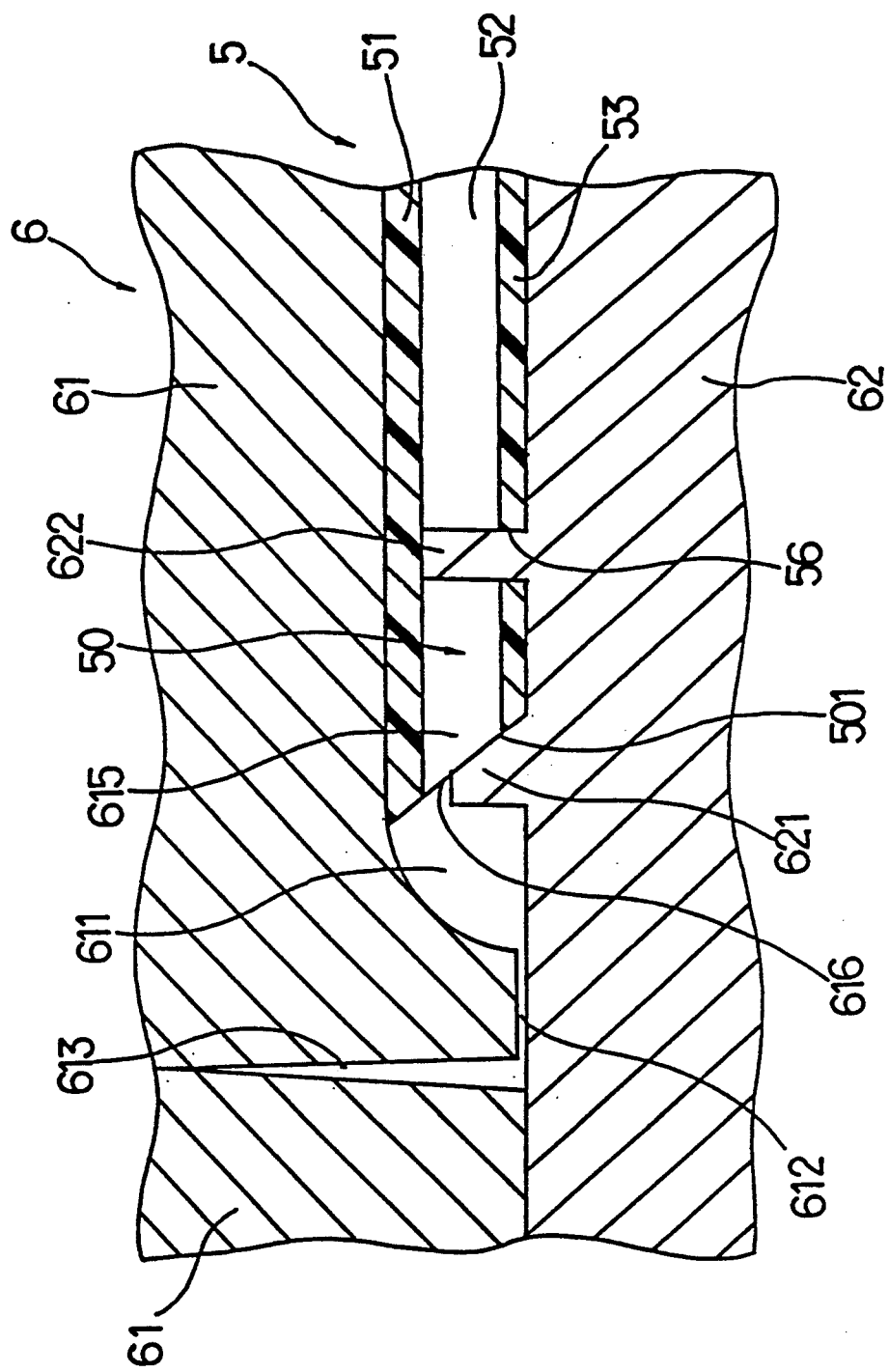

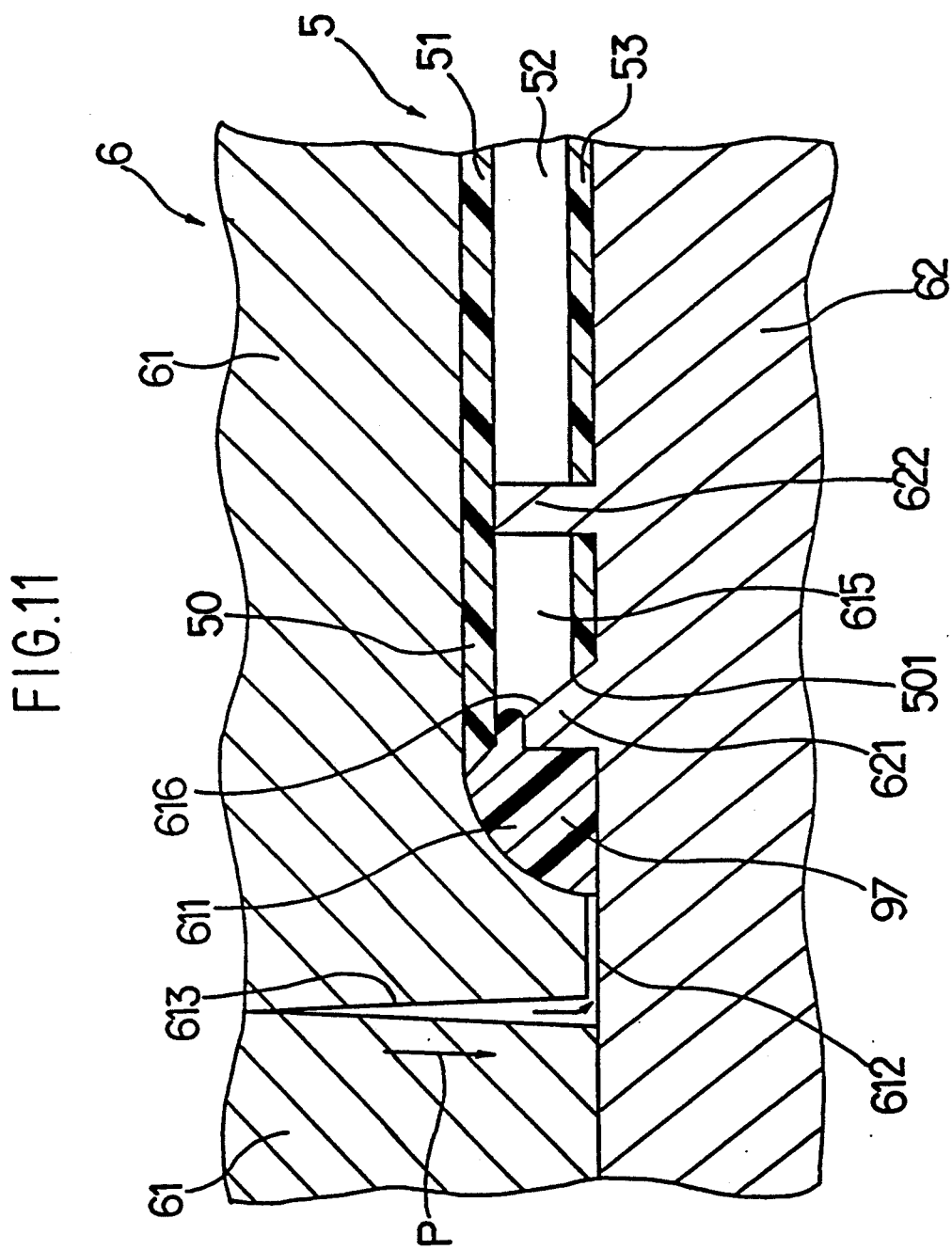

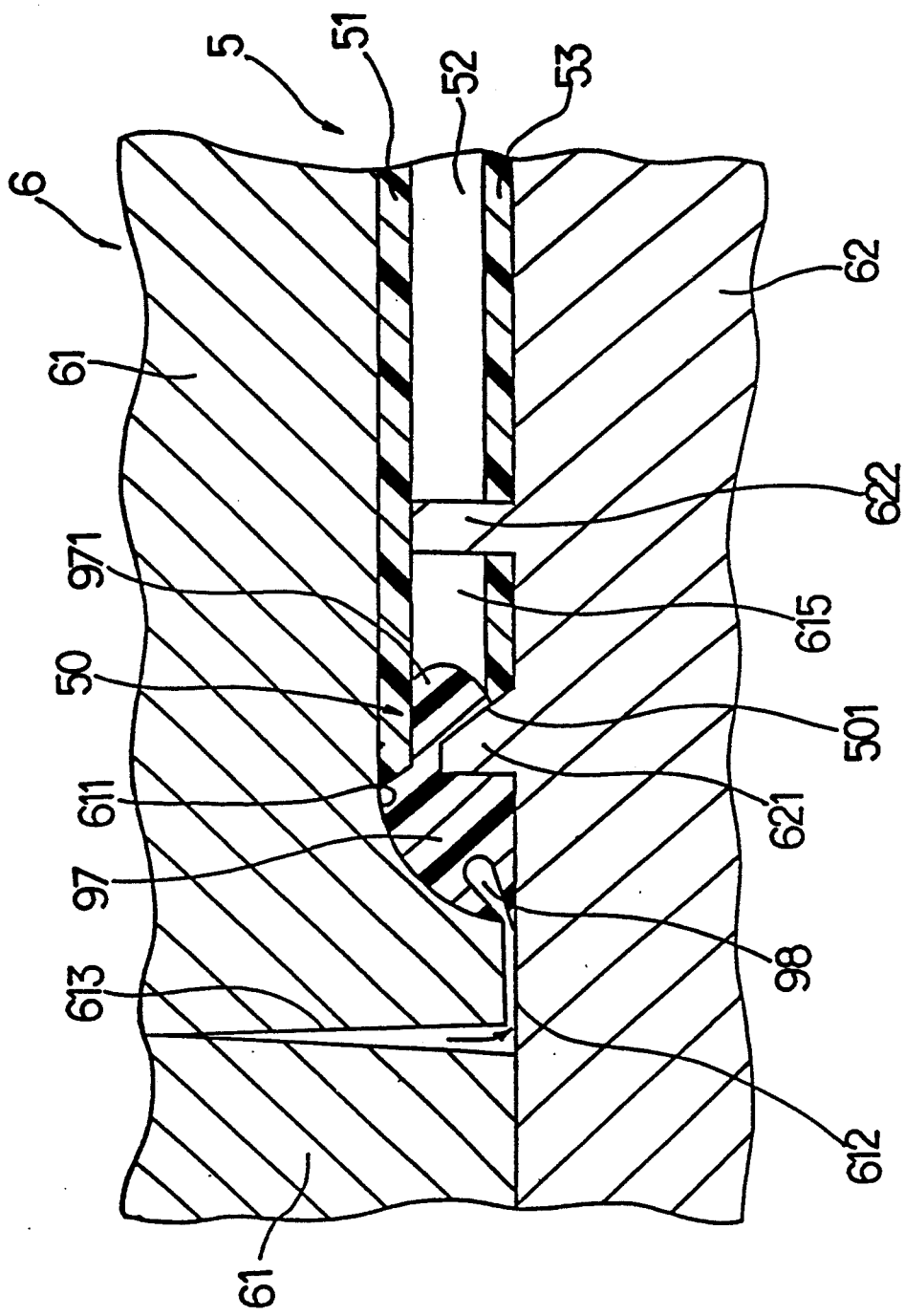

METHOD FOR MOLDING HOLLOW SHAPED BODIES

BACKGROUND OF THE INVENTION

1. Field of the Related Invention

The present invention relates to a method for molding hollow shaped bodies such as assist grips, door grips, and molding strips.

2. Description of the Related Art

An assist grip, such as one schematically shown in FIG. 20, indicated with reference numeral 9, for use in the interior of automobiles is generally required to be lightweight, and is therefore made as a hollow shaped body. The assist grip comprises a synthetic-resin made skin 93 and a hollow portion 95 therein.

In the beginning of molding the hollow shaped body described above, as shown in FIG. 21, a molten synthetic resin 90 is injected into a mold cavity 80 provided inside the mold block 8 at an amount sufficient to form the skin, i.e., the outer wall, of the hollow shaped body. Accordingly, a completed injection leaves an unfilled portion 801 remaining uncharged with the synthetic resin 90 between the front end 901 of the injected resin and a wall of the cavity 80. This is the so-called "short-shot" state.

Immediately thereafter, in the next step as shown in FIG. 22, to the inside of the synthetic resin 90 at the short-shot state is introduced a gas 7 such as nitrogen and air to thereby form a hollow portion therein. After introducing the gas 7, a little amount of molten resin 90 is further injected to the mold cavity. The introducing of the gas 7 is continued until the front end 901 of the resin completely fills in the aforementioned unfilled portion 801 which remained uncharged with the resin. Cooling comes next, upon completion of the gas introducing step.

Thus, a hollow portion 95 is formed inside the synthetic resin 90 by introducing the gas 7 inside, and on the outside thereof is formed the skin 93. That is, a hollow shaped body comprising a skin 93 having a hollow portion 95 therein is formed as disclosed in JP-B Nos. 57-14968 and 54-15291, and JP-A No. 53-9870 ("JP-B" as used herein stands for "published examined Japanese Patent Application", and "JP-A" for "published unexamined Japanese Patent Application").

To the outer surface of the skin 93 is transferred, further, a grained pattern or the like provided on the inside wall of the cavity.

In FIGS. 21 and 22, the mold block 8 aforementioned comprises a plate 81 for fixing the metal mold at the fixed side, a pusher plate 82, a fixed block 83, and a movable block 84. Between the fixed block 83 and the movable block 84 is provided the mold cavity 80 inside which is formed the hollow shaped body.

Further to the metal-mold attachment plate 81 is provided a sprue bush 85 and a Z-shaped sprue-puller pin 86. The sprue bush 85 comprises a sprue 851 through which the synthetic resin 90 and the gas 7 is injected. The sprue-puller pin 86 comprises a Z-shaped cutout at the front edge, and is necessary for drawing out the excess resin remaining inside a runner 831. The fixed block 83 comprises a runner 831 and a gate 835.

The foregoing method, however, presents the following problems.

The FIG. 20 assist grip 9 which can be attached to the interior of an automobile via the hole 96, was molded by a conventional method for molding a hollow shaped body. Such hollow shaped bodies, however, suffer from the formation of a hesitation mark 91 on the surface. This hesitation mark, which is also known as uneven luster, is unfavorable because it renders poor appearance to the product.

The inventors, after an intensive study on the generation of such unwanted hesitation mark 91, found that the generation thereof was ascribed to the process comprising a temporary stop at the injection of the molten synthetic resin 90 in the short shot state (as shown in FIG. 21) followed by incorporating thereafter the gas 7.

That is, such a stop, though only a short period of time, is sufficient for cooling the front end 901 of the molten synthetic resin. Accordingly, even if the gas is incorporated thereafter to extend the front end 901 by the action of the gas, the cooled front end would not intimately make contact with the inner wall of the cavity 8, and thereby the pattern, such as crimps provided to the inner wall of the cavity, would be insufficiently transferred. This means that a plane surface would be provided to the front end 901 and thus the hesitation mark 91 described above is produced. It can be seen, further, that the hesitation mark 91 is formed locally on the front end 901 of the synthetic resin which stayed in the short shot state (see FIG. 21, shown with arrow A).

The aforementioned hollow shaped bodies further occasionally suffers dents, i.e., shrink marks, which are believed to form during molding, by lack of balance in shrinking and pressure ascribed to the non-uniform thickness of the wall of the hollow portion.

SUMMARY OF THE INVENTION

An object of the present invention in the light of the aforementioned problems is to provide a simple process for producing hollow shaped bodies free from hesitation marks and shrink marks (dents).

The present invention provides a method of molding a hollow shaped body having a skin made of a synthetic resin and a hollow portion therein, by using and/or preparing a mold block provided with a mold cavity in the shape of the hollow shaped body, a tub into which an excess amount of the synthetic resin is flown and a small flow path communicating between the mold cavity and the tub. The process includes injecting a molten synthetic resin for forming the skin of the hollow shaped body into the mold cavity to fill up the cavity and then introducing a gas into the injected synthetic resin to form the hollow portion, while simultaneously allowing an excess part of the synthetic resin to flow out from the mold cavity to the tub through the small flow path.

Other objects and advantages will become apparent to those skilled in the art upon reading the following brief and detailed descriptions of the drawings and various embodiments of the invention.

BRIEF DESCRIPTION OF THE DRAWINGS

FIG. 1 is a cross sectional view of the mold block charged with a synthetic resin; FIG. 2 is a cross sectional view of the mold block upon introducing a gas into the mold; and FIG. 3 is a cross sectional view upon opening the mold block.

FIGS. 5 to 13 are related to Example 3 according to the present invention. FIG. 5 is a front view of a molding strip according to the present invention; FIG. 6 is a planar view of the back of the molding strip; FIG. 7 is a cross sectional view taken on line 7—7 of FIG. 5; FIG. 8 is a cross sectional view taken on line 8—8 of FIG. 5; FIG. 9 is a cross sectional view taken on line 9—9 of FIG. 5; and FIGS. 10 to 13 shows the process steps for molding the molding strip using the mold block.

FIG. 15 is a cross sectional perspective view taken on line 15—15 of FIG. 14.

FIG. 16 is a perspective view of the back plane of the molding strip body; and FIG. 17 is a cross sectional view of the molding strip inside the mold block.

FIG. 19 is a cross sectional view taken on line 19—19 of FIG. 18.

DETAILED DESCRIPTION OF THE INVENTION

Figure 1:
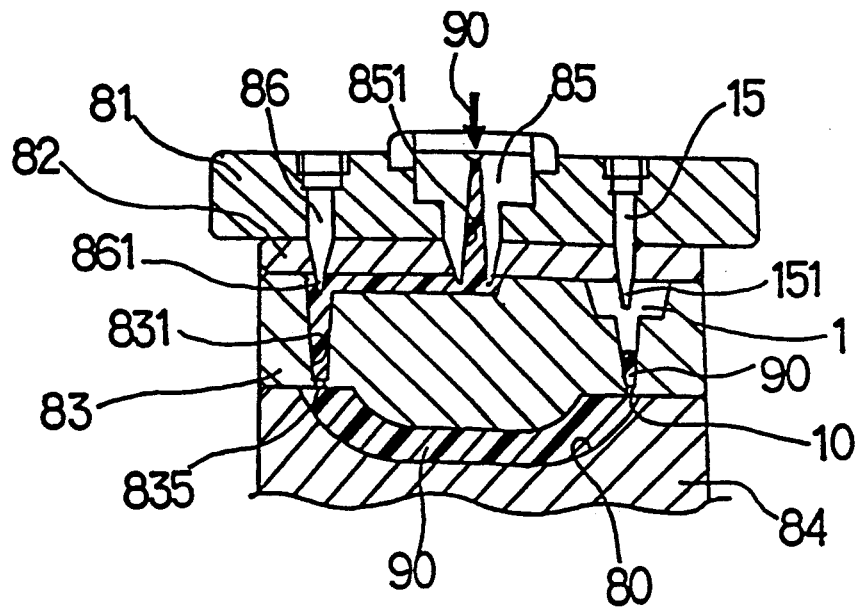
FIGS. 1 to 3 show the process for molding a hollow-shaped body according to Example 1 of the present invention.

A main point according to the present invention is that it provides for and uses a mold block having a mold cavity in the shape of a desired hollow-shaped body, a tub outside the cavity and a small flow path communicating between the cavity and the tub. The process includes injecting a molten synthetic resin into the cavity to fill up the cavity with the resin and introducing gas into the synthetic resin to then form the hollow portion, while simultaneously allowing a part of the synthetic resin, i.e., the excess, to flow from the cavity through the small flow path to the tub.

That is, the process according to the present invention does not include a short shot state, nor the step of forming a non-charged portion in the front part of the cavity.

The tub aforementioned functions as a liquid pool which takes in the excess amount of synthetic resin not directly participating in molding the hollow shaped body. The tub volume should be, accordingly, about the same as, or larger than that of the hollow cavity inside the hollow shaped body. Alternatively, a plurality of tubs may be provided.

The tub in general is provided at the outside of the cavity, i.e., at the part the molten synthetic resin reaches last upon its advancement to fill up the mold cavity and preferably at such a position where inner air in the mold cavity reaches last upon its advancement and is discharged when the synthetic resin is charged in the mold cavity.

The small flow path above preferably has a diameter in the range of from 0.3 to 2.5 mm. When the flow path is smaller than the 0.3 mm in diameter, it is clogged with the molten synthetic resin and the resin is prevented from smoothly flowing therethrough. When the flow path has a diameter exceeding 2.5 mm, the injected synthetic resin tends to overflow into the tub, so it becomes difficult to transfer the pattern of the inner wall of the cavity to the outer surface of the hollow shaped body precisely.

The length of the small flow path (i.e., the distance between the cavity and the tub) is preferably from 0.5 to 10 mm. If the length is less than 0.5 mm, the synthetic resin easily flows into the tub at the injection; on the other hand, if the length exceeds 10 mm, it is difficult for the synthetic resin to flow into the tub when the gas is introduced into the resin.

The synthetic resin for use in the present invention includes AS resin, ABS resin, hard PVC resin, polypropylene, polypropylene/EPDM resin blend, SEBS (styrene/ethylene/butadiene/styrene) resin, SBS resin, and compositions thereof containing fillers such as talc and the like. Gases which may be introduced into the resin to form the hollow portion are nitrogen, air and the like.

The injection of the synthetic resin into the mold cavity preferably is effected continuously until the mold cavity is completely filled up with the resin. In this case, some amount of resin at the top end may flow into the small flow path, or furthermore, into the tub. By thus providing some amount of the resin forward from the mold cavity in advance, the top end of the synthetic resin can readily flow into the small path or further into the tub, so the subsequent introduction of the gas can be smoothly operated.

The first step according to the process of the present invention comprises injecting the molten synthetic resin into the cavity having the outer shape of the intended hollow shaped body, and filling up the cavity with the resin. In this injection step, the flow of the molten resin into the small flow path or into the tub is hindered because the small flow path is quite small in diameter, however, a part of the flow can be forcibly introduced into the small flow path or into the tub.

Immediately after charging the cavity with the synthetic resin, the gas is introduced into the synthetic resin inside the cavity. The gas advances forward and at the same time, pushes the molten resin forward and against the inner wall of the cavity. Thus, there is produced a portion of the molten resin which then can not be accommodated in the cavity, and this portion is pushed into the tub via the small flow path. In this way a hollow portion is formed inside the resin. Some portion of the gas may go into the tub with no particular inconvenience.

The outer surface of the synthetic resin, which is in contact with the inner wall of the mold cavity, is cooled and solidified by the inner wall to form the skin of the hollow shaped bodies, i.e., the crust, with the injection of the resin and the subsequent incorporation of the gas inside the resin. Simultaneously, the patterns such as crimps provided on the inner wall of the cavity is transferred onto the outer surface of the skin.

Figure 21:
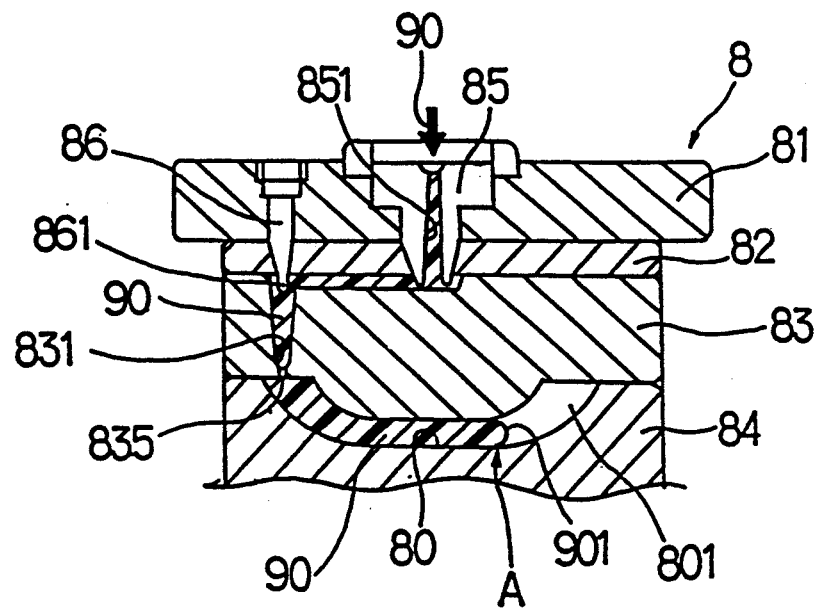
FIG. 21 is a cross sectional view of a conventional mold block at its short-shot state.
Figure 22:
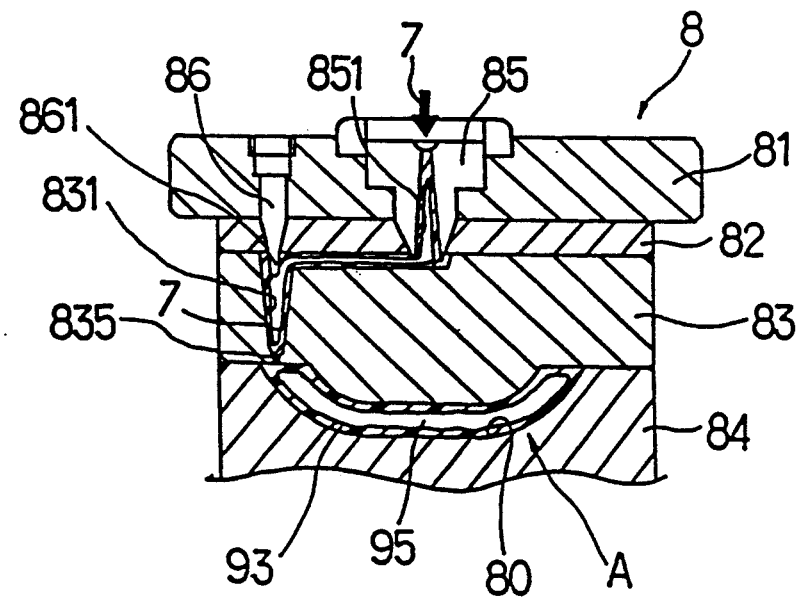
FIG. 22 is a cross sectional view of a conventional mold block at the injection of a gas.

As described above, the process according to the present invention introduces gas into the inside of the molten synthetic resin charged in the cavity, after filling the cavity with the resin, to force an excess amount of the synthetic resin into the small flow path. Accordingly, the outer surface of the synthetic resin is totally in contact with the inner wall of the cavity at the gas-injection stage. This signifies that the process according to the present invention proceeds in a completely different manner as compared with those of the prior art in which the cooled front of the synthetic resin is pushed inside the mold cavity by the action of the introduced gas (see FIGS. 21 and 22). Thus, the molded body resulting from the present invention is free from hesitation marks which are conventionally produced originally by the cooling and solidification of the resin front at its short shot state. As previously indicated, this presents a problem in conventional moldings.

The synthetic resin which flows into the small flow path and further into the tub is recovered together and recycled in the process with the residual resin remaining in the runner and the gate. Therefore, there is no drop in the body yield.

From the foregoing description it can be seen that the present invention provides a simple process for molding hollow shaped bodies.

Further according to the present invention, it is possible to produce a molding strip, which includes a main frame and an end cap with a hollow portion therein, using and/or preparing the main frame of the molding strip having a passage provided at a head portion thereof, and a mold block having a protrusion to form a small flow path by partially narrowing the passage. The process includes disposing the main frame in the mold block so as to define a cavity for molding the end cap, which is formed between the head portion of the main frame and the mold block; injecting a molten synthetic resin into the cavity so as to fill up the cavity with the synthetic resin to thereby form a hollow portion, while simultaneously allowing a part of the injected synthetic resin to flow from the cavity to the passage of the main frame through the small flow path.

As the main frame of the molding strip, there can be used for example, a hollow shaped body with a passage in the form of a pipe, which is produced by extrusion molding (see Example 3 set forth below), and an extrusion-molded body having a passage provided at the center of the back surface in the form of a groove (see Example 4 below). Also there can be mentioned an extrusion-molded body having the passage as described above, but only in the front end (see Example 5 below), including either or both of the ends of the molding strip.

The mold block includes a mold cavity provided between the front end of the molding strip and the inner wall of the mold block, a tub provided between the passage of the main frame and the inner wall of the mold block outside of the cavity, and a small flow path communicating the cavity and the tub. The cavity is provided in the same shape as that of the intended shape of the front end member which is to be joined with the main frame.

The synthetic resin for use as the main frame of the molding strip and the front end member to be attached therewith are thermoplastic resins such as polypropylene (PP), acrylonitrile/butadiene/styrene copolymer (ABS), polyphenylene oxide (PPO), and non-rigid PVC.

Bonding can be carried out, for example, by fitting a part of the front end member (the fitting protrusion) with the passage of the main frame of the molding strip (see Examples 3 to 5).

A gas may be introduced either simultaneously or immediately after injecting the molten synthetic resin.

The process for manufacturing the molding strip set forth above includes the first step of producing the main frame of the molding strip by, for example, extrusion-molding.

Then, the front end of the main frame of the molding strip produced above is set inside the mold block in such a way that the inner wall of the mold block and the front end of the main frame of the molding strip form a cavity having the same shape as that of the front end member which is to be bonded. Into this cavity is injected, as set forth above, a molten synthetic resin until the cavity is filled with the resin. Subsequently thereafter, a gas is introduced inside the resin to make a hollow portion inside the resin, and the excess amount of the resin pushed away by the gas flows into the tub defined by the passage and the mold block via the small flow path. The gas may be, alternatively, injected at the same time with the resin. In this way a hollow-shaped front end member is provided at the front end of the main frame to produce an integrated body comprising a main frame and an end member.

Another advantageous point in the process according to the present invention is that the front end member is hollow. This signifies that the front end member has a thin wall and thereby the member can be produced with a good appearance free from defects such as shrink marks.

EXAMPLES

Now the invention is described in further detail with reference to non-limiting examples.

EXAMPLE 1

A method of producing a hollow shaped article according to an embodiment of the present invention is described below referring to FIGS. 1 to 4.

Figure 20:
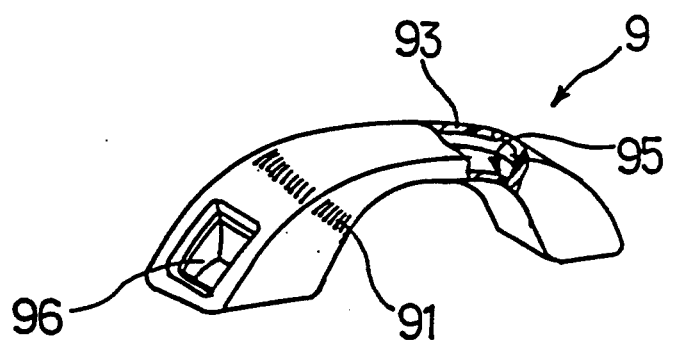
FIG. 20 is a partially cutaway view in perspective of a conventional assist grip.

A hollow-shaped assist grip (see FIG. 20) having the same shape as one produced according to a commonly used process as described above is molded.

The mold block to be used in the present example is shown in FIG. 1. It has a fixed block 83 comprising a tub 1 and a small flow path 10. The flow path 10 has an opening in the mold cavity 80, and the cross section thereof is circular with a diameter of 1.5 mm. The length of the small flow path, i.e., the distance between the cavity 80 and the tub 1, is set to 3 mm.

Further, the upper space of the tub 1 is provided with a pusher plate 82 through which a Z-pin 15 is vertically set downward from a metal-mold attachment plate 81. This Z-pin 15 has a Z-shaped cutout on the front tip 151. The other details of the mold block structure are the same as described above as the prior art.

In molding a hollow shaped body, as shown in FIG. 1, a molten synthetic resin 90 is injected into the cavity 80 through the sprue 851 provided in the sprue bush 85 and the gate 835 via the runner 831 provided in the fixed block 83. The molten resin 90 is charged until the cavity 80 is completely filled up with the resin 90. In this case, a small amount of the synthetic resin 90 flows through the small flow path 10 into the lower part of the tub 1.

Figure 2:
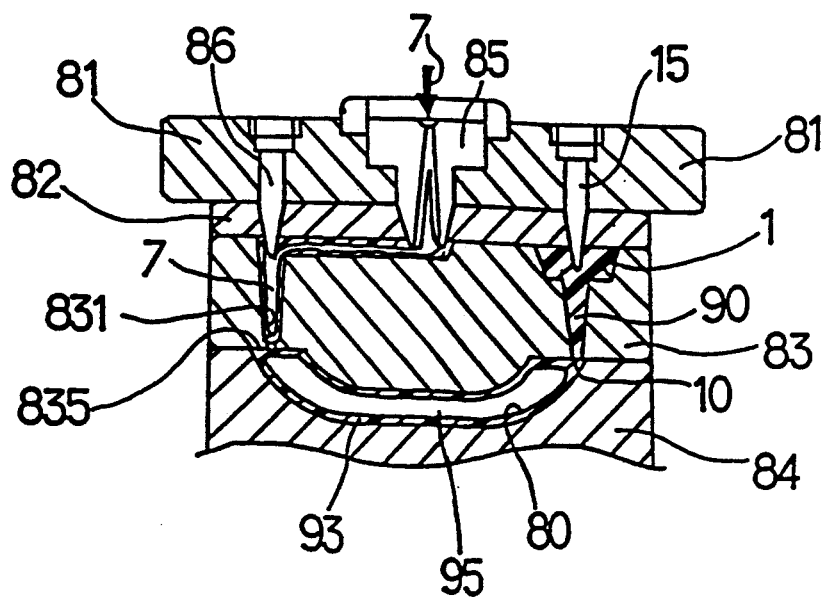

After the cavity is charged with the synthetic resin 90, a gas 7 is introduced through the sprue bush 85, as shown in FIG. 2. The gas enters into the molten resin 90 charged inside the cavity, and advances forward pushing the resin 90 forward and concomitantly against the inner wall of the cavity.

In consequence, the portion of the synthetic resin 90 pushed out by the gas enters into the tub I via the small flow path 10. Thus is formed a hollow portion 95 inside the synthetic resin 90. The formation of the hollow portion is almost completed at the point the gas 7 reaches near the front end of the hollow shaped body, i.e., the vicinity of the small flow path 10, at which point the tub 1 also is filled up with the synthetic resin pushed out from the mold cavity.

The synthetic resin 90 which is in contact with the inner wall of the cavity 80 during the injection thereof and the introducing of the gas 7 is cooled by the inner wall and forms the skin 93 of the hollow shaped body. Since the gas 7 applies pressure to the skin 93, a crimp pattern provided on the inner wall of the cavity is transferred to the outer surface of the skin 93.

Figure 3:
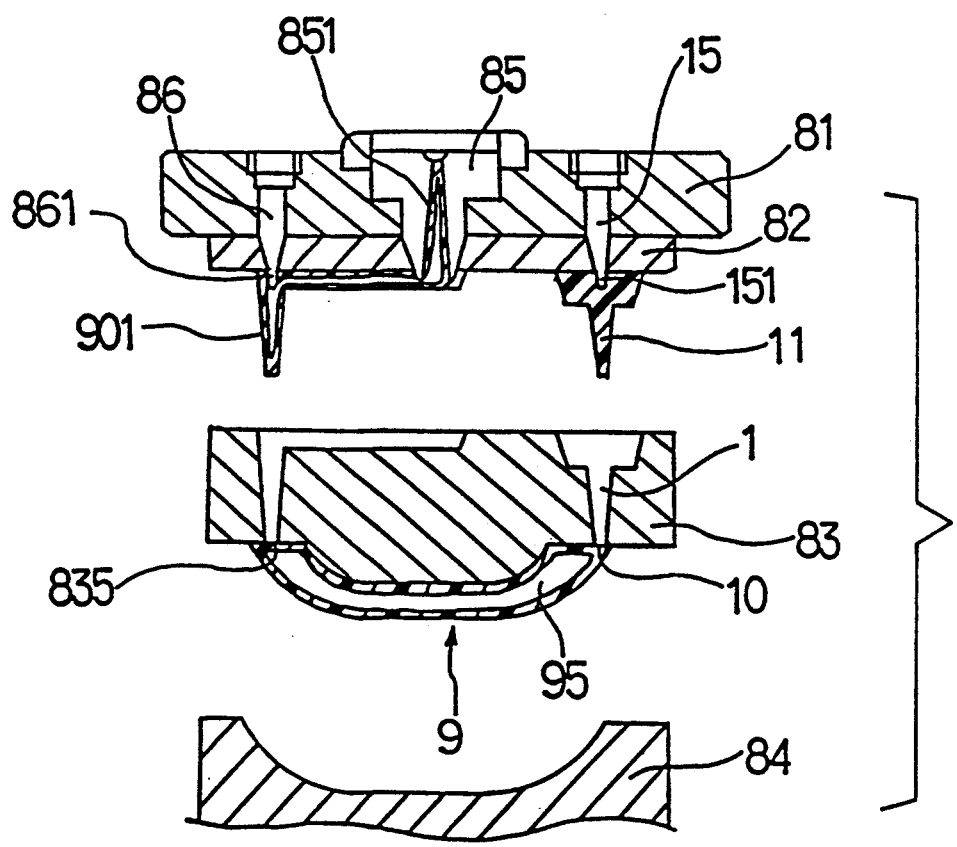

Upon completion of the introduction of the gas 7, the hollow shaped body is taken out from the mold block after sufficiently cooling the synthetic resin. That is, as shown in FIG. 3, the movable block 84 is moved downward apart from the fixed block 84, while the pusher plate 82 together with the attachment plate 81 is pulled upward from the upper part of the fixed block 83. The mold block is separated into three parts. Finally, in the lower part of the fixed block 83 is provided an assist grip 9 as shown in FIG. 3.

Further, adhered to the front tip 151 of the Z-pin 15 is the solid excess amount 11 of the synthetic resin which flowed from the cavity to the inside of tub 1. Also there remains an excess portion 901 of the synthetic resin from the liner adhered inside the sprue 851 of the sprue bush 85 and to the front tip 861 of the Z-pin 86. Those synthetic resin portions 11 and 901 are automatically cut from the hollow shaped body at the entrance point of the small flow path 10 and the gate 835, respectively, upon the release of the hollow shaped body from the mold blocks. The excess resin portions 11 and 901 above are reused in the subsequent process as a part of the starting resin material.

The process according to the present invention is advantageous in that the outer surface of the synthetic resin 90 is in complete contact with the inner wall of mold cavity before the introduction of a gas 7. Accordingly, the synthetic resin need not experience a short shot state followed by pushing the front end of the cooled synthetic resin by the pressure of the gas blown into the resin. This eliminates formation of hesitation marks on the synthetic resin during the stay thereof in the mold cavity 80.

In the process according to the present invention, only the resin portions indifferent to the product, i.e., those residing in the small flow path or in the tub, are to suffer from those unwanted hesitation marks.

EXAMPLE 2

Figure 4:
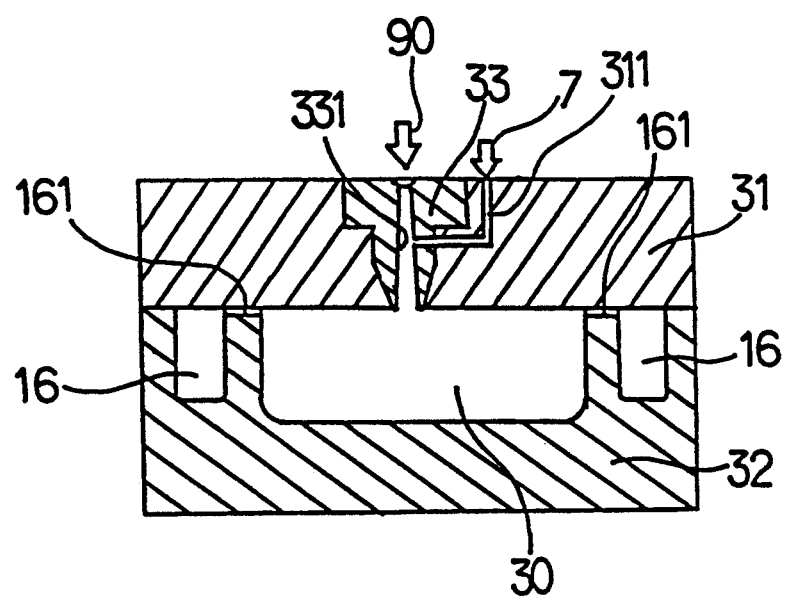
FIG. 4 is a cross sectional view of the mold block according to Example 2 of the present invention.

This example illustrates a process for molding a hollow shaped body according to another embodiment of the present invention, with reference to FIG. 4, wherein a tub 16 together with a cavity 30 are provided in the movable block 32.

More specifically, the mold block for use in the embodiment includes a fixed block 31 and a movable block 32. The fixed block 31 further includes a sprue bush 33 having a sprue 331 therein, through which the synthetic resin is injected, and a gas inlet hole 311. Between cavity 30 in which the hollow shaped body is to be molded and a tub 16 is small flow path 161 for communicating therebetween. The tub 16 is provided in two separate parts, on opposite sides of cavity 30, in the movable block 32.

The process according to this embodiment is carried out in the same manner as described in Example 1. Thus, a molten synthetic resin is charged in the mold cavity 30, and thereafter a gas is introduced into the resin to drive out an excess amount of the resin into the tub 16 through the small flow path 161.

The same effect as in Example 1 is obtained in this embodiment.

EXAMPLE 3

This example illustrates a process for molding a molding strip according to an embodiment of the present invention, with reference to FIGS. 5 to 13.

First, the molding strip itself is explained in detail in reference to FIGS. 5 to 9. The molding strip to be molded according to the present embodiment has a hollow front end member 4 bonded to the front end 50 of the main frame 5 of the molding strip.

The hollow front end member 4 (see FIGS. 5 to 7) is an injection-molded hollow shaped body made of polyvinyl chloride. This front end member 4 has an end cap 41, a hollow portion 42 formed inside the end cap 41, a bonding protrusion 43 extending from the hollow portion to the main frame 5, an upper ornamental edge 44, and an attachment plane 45 by which the molding strip is attached to an automobile body.

The main frame 5 of the molding strip, as shown in FIGS. 5, 6, 8 and 9, is an extruded hollow molding in the form of a pipe. The main frame 5 of the molding strip includes a main molding 51 of a predetermined length, a hollow portion 52 formed inside the main molding 51, an upper ornamental edge 54 provided on the upper side of the hollow portion 52, and an attachment plane 53 by which the molding strip is attached to the body of an automobile.

Figure 5:
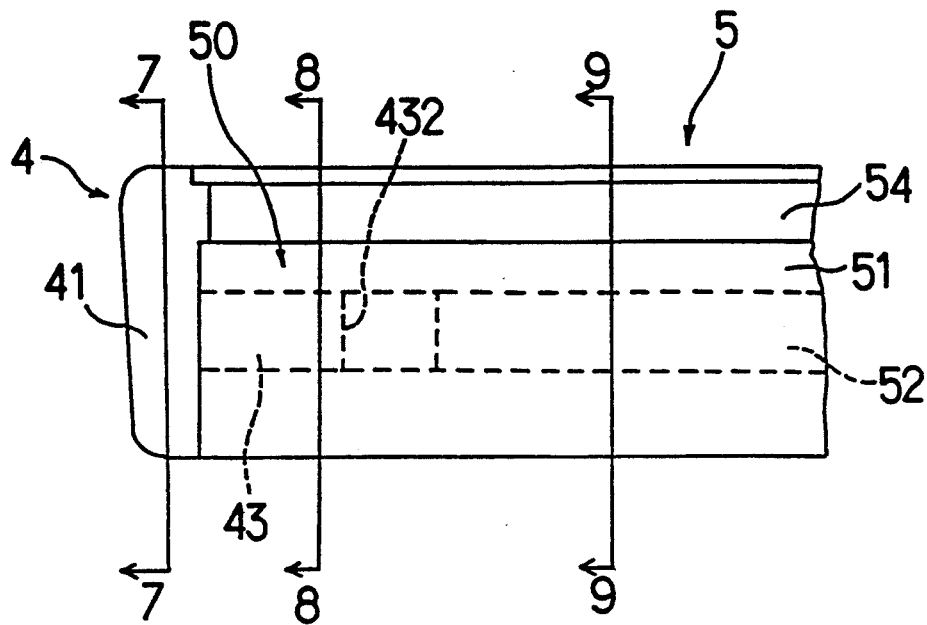
Figure 6:
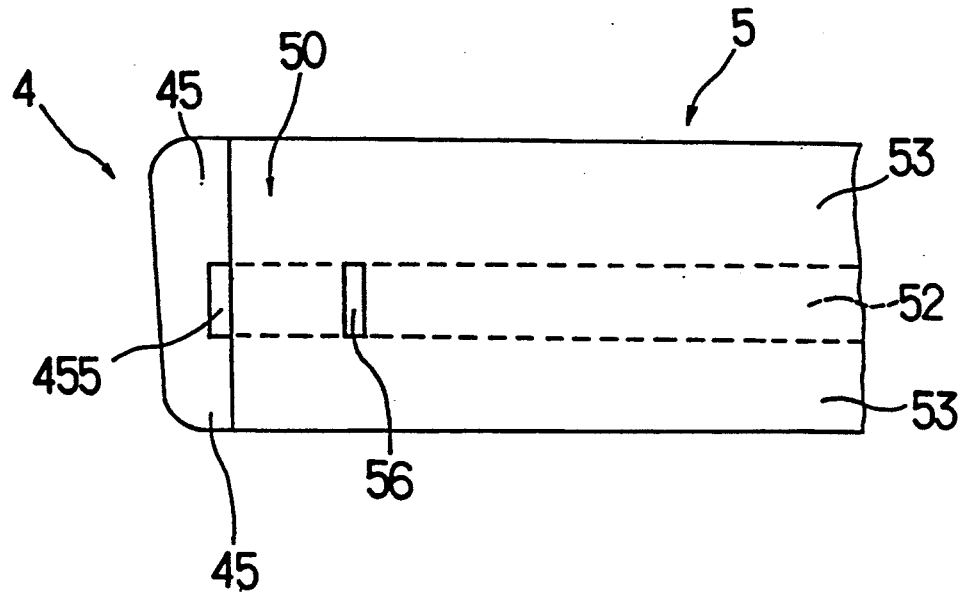
Figure 9:
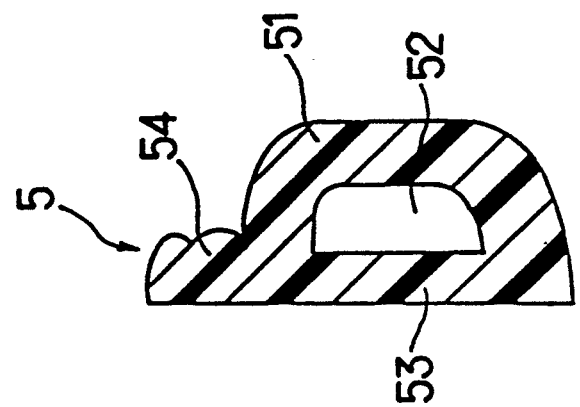
Figure 8:
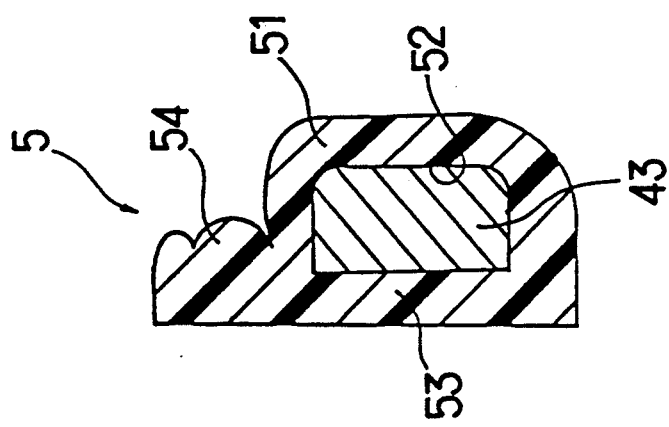
Figure 7:
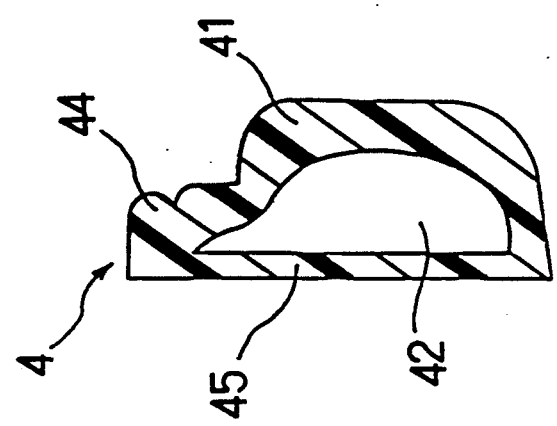

Further, as shown in FIGS. 5 and 8, the bonding protrusion 43 of the front end member 4 fits into the hollow portion 52 formed inside the main frame 5. As seen in FIG. 6, both the attachment plane 45 of the front end member 4 and the attachment plane 53 of the main frame 5 are located in the same plane. The upper ornamental edge 44 of the front end member is provided in a design similar to that of the upper ornamental edge 54 of the main frame 5, so that they may result in a pattern having a continuous appearance. The end cap portion 41 of the front end member 4 and the outer surface of the main frame are set on the same plane, and constitute a continuous appearance. Further, as shown in FIG. 6, the back plane of the molding strip comprises a concave portion 455 in the front end member, formed by a protrusion (621 by which the small flow path is formed as described below relative to FIGS. 10-13) and an insert hole 56 to which a protrusion (622 in FIGS. 10-13) is inserted to avoid resin flow.

Now the process for molding the molding strip above is described below with reference to FIGS. 10 to 13.

First, the main frame 5 of the molding strip is produced by extrusion-molding using polyvinyl chloride. To the front end of this main frame 5 is provided a diagonally tapered portion 501.

Figure 13:
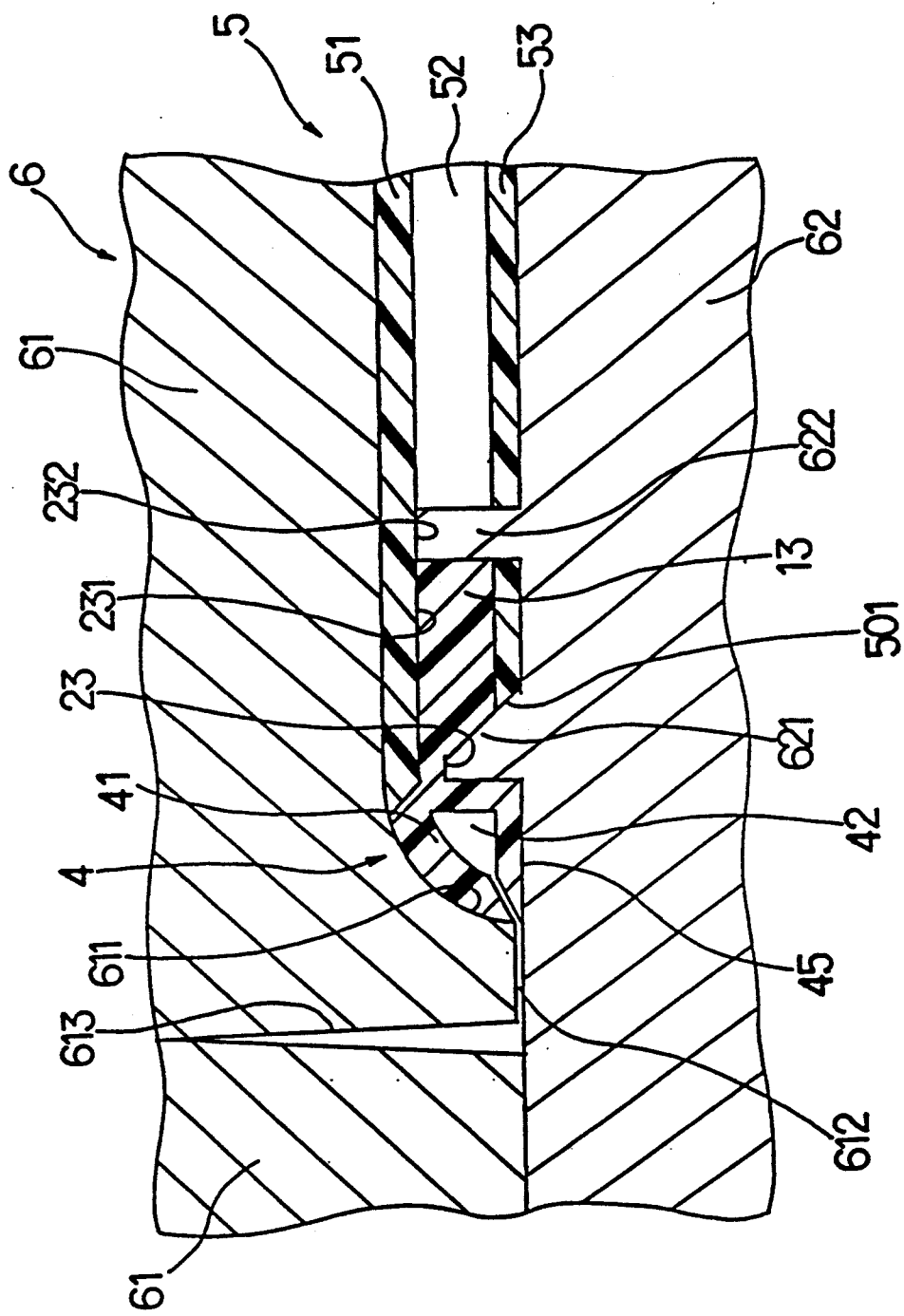

The front end 50 of the main frame 5 is then placed in the mold block 6, as shown in FIG. 10, leaving a cavity 611 defined by the front end 50 of the main frame 5, the upper mold block 61, and the lower mold block 62. Subsequently, as shown in FIG. 11 and discussed below, a hot-melt synthetic resin 97 is injected into the cavity 611 until the cavity 611 is completely filled with the resin 97. Then a pressurized gas 7 is introduced inside the resin 97, as shown in FIG. 12, to result in a molding strip as shown in FIG. 13, comprising a main frame 5 and a hollow-shaped front end member 4 bonded to the front end of the main frame 5.

The process above is described in further detail below. The mold block 6 includes, as shown in FIGS. 10 to 13, an upper block 61 and a lower block 62. The upper block has a sprue 613 through which the synthetic resin is injected, a gate 612, a cavity 611 which is communicated to the gate 612, and a tub 615 which is communicated to the cavity 611.

The lower block 62, on the other hand, includes in the vicinity at which the front end 50 of the main frame 5 is placed, a protrusion 621 to form a small flow path and another protrusion 622 to avoid the flowing out of the resin.

First, as shown in FIG. 10, the main frame 5 is set in such a manner that the front end 50 thereof is positioned inside the mold cavity of the mold block 6, to define a cavity 611 with the front end 50 of the main frame 5, the upper block 61, and the lower block 62. Further, downstream of the protrusion 621 is a tub 615 communicating with the cavity 611, via a small flow path 616.

Then comes the molding step, which comprises injecting polyvinyl chloride 97 into the cavity 611 through the sprue 613 and the gate 612, and filling up the cavity with the resin (see FIG. 11). The polyvinyl chloride 97 to be charged is hot melted beforehand in a cylinder (not shown in the Figure) at from about 190° C. to about 210° C.

Nitrogen gas 98 as the pressurized fluid is then introduced into the soft polyvinyl chloride 97 charged into the cavity. The polyvinyl chloride portion 971 driven out from the cavity 611 by the action of the gas runs into the tub 615 through the small flow path. This nitrogen gas 98 should be introduced immediately after the polyvinyl resin 97 is injected. In this step a hollow portion 42 is formed in the polyvinyl chloride 97, as shown in FIG. 13. Further, a bonding protrusion 43 is found in the tub 615 as a result of cooling and solidification of the polyvinyl chloride portion which overflowed from the cavity 611. In this way the bonding protrusion 43 bonds to the hollow front end member 4 and the front end of the main frame 5.

In the process according to an embodiment of the present invention, firstly, the cavity 611 shown in FIG. 11 is filled up with polyvinyl chloride 97. Then, as shown in FIG. 12, nitrogen gas 98 is blown into the polyvinyl chloride 97, and the excess resin portion 971 pushed out from the cavity flows into the tub 615. This signifies that the source of introducing the shrink mark, i.e., the resin which solidifies upon injection of the nitrogen gas 98, is ejected from the cavity to the tub 615 together with the excess portion 971 of polyvinyl chloride. The front end member 4 according to the present invention is thus molded free from shrink marks. If the nitrogen gas 98 is introduced into the resin without filling up the cavity 611 with the polyvinyl chloride 97, on the other hand, the resulting front end member 4 would suffer from shrink marks.

The front end member 4 according to the present invention, however, as described above, comprises a hollow cavity 42 and is composed of a very thin wall. Accordingly, the front end member 4 is completely free from shrink marks.

It is therefore concluded that the present invention provides a simple process for molding a molding strip which can be conveniently attached to desired parts, and which has good appearance free from shrink marks.

A further advantageous point in the present invention is that the mold block includes such a tub as described above, so it results in hollow moldings completely devoid of hesitation marks which are often encountered as problems in the conventional processes for molding hollow shaped bodies.

EXAMPLE 4

A molding strip according to an embodiment of the present invention is described below with reference to FIGS. 14 and 15. Further reference is made to FIGS. 10 to 12 shown above.

Figure 15:
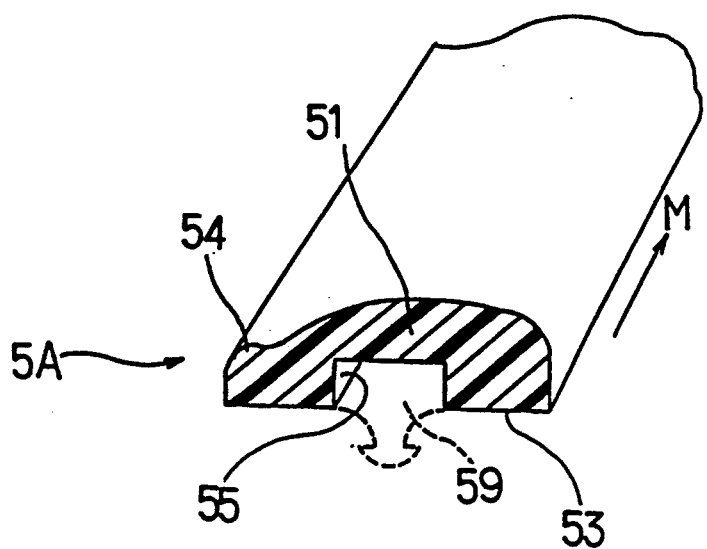

The molding strip described here according to an embodiment of the present invention is similar to that produced in Example 3, wherein the frame 5 is replaced by a main frame 5A having a groove 55 on the back plane thereof, as shown in FIG. 15. The groove 55 is provided along the longitudinal direction M. In this case, the main frame 5A is obtained in advance by extrusion-molding polypropylene. The front end member 2 is also made of polypropylene, by injection molding. The other details are the same as those described in Example 3.

Figure 14:
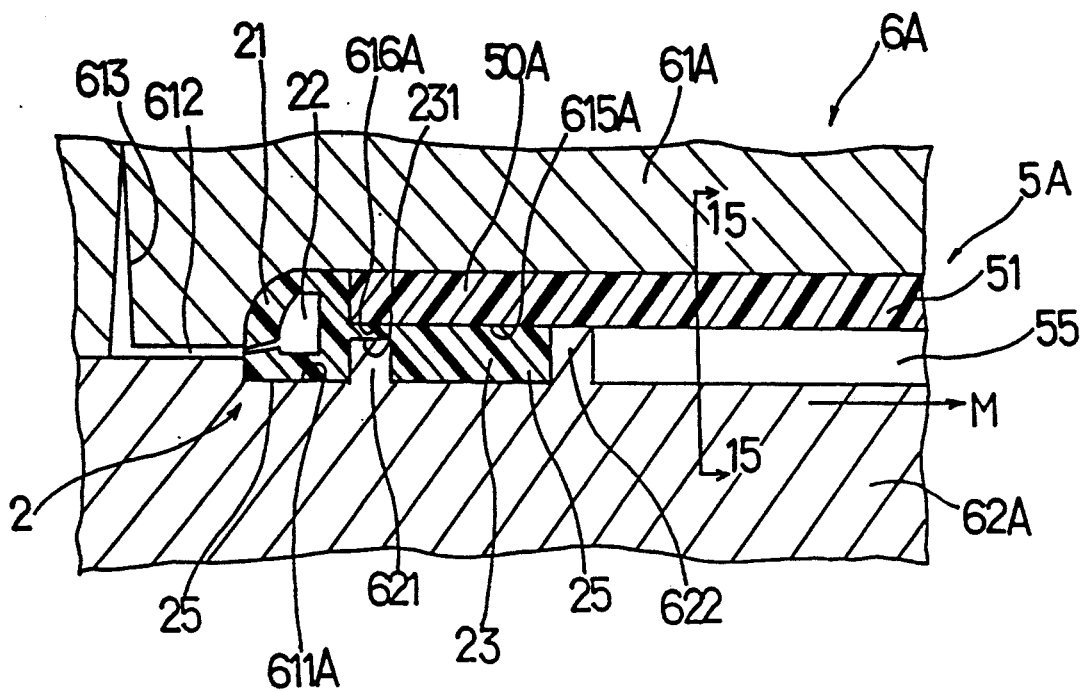
FIGS. 14 and 15 relate to Example 4 according to the present.

The process for molding the molding strip above comprises preparing a mold block 6A as in Example 3, which comprises an upper block 61A and a lower block 62A as shown in FIG. 14. In this case, note should be taken that the small flow path 616A and the tub 615A are provided in different shapes as compared with those of Example 3. The main frame 5A is then placed inside the mold block 6A as in Example 3. That is, an open space which is nearly the same shape as that of the front end member 2 is defined inside the molded cavity 611A by the front end 50A of the main frame 5A, the upper block 61A, and the lower block 62A (see FIG. 10).

Polypropylene 97 is then injected into the cavity 611A (see FIG. 11), and nitrogen gas 98 is thereafter introduced into the resin 97 (see FIG. 12).

According to the process above, molding strip in FIG. 14 was molded and includes a main frame 5A to which a front end member 2 is bonded, a bonding protrusion 23 produced by a tub 615 and a concave portion 231 produced in the front end member by the small flow path 616A. The front end member 2 comprises an end cap portion 21, an attachment plane 25 by which the molding strip is to be attached to an automobile body, and a hollow cavity 22. The propylene resin and the nitrogen gas in this process behaves in the same manner as in the process of Example 3. The resulting front end member 2 is free from shrink marks and hesitation marks.

The process according to an embodiment of the present invention as described above simply provides a molding strip which can be conveniently attached to desired parts, and which has a good appearance free from shrink marks. Furthermore, the molding strip according to the embodiment of the present invention as shown in FIG. 15 comprises a groove 55 in the backside to which a grip 59 can be fitted.

EXAMPLE 5

Figure 16:
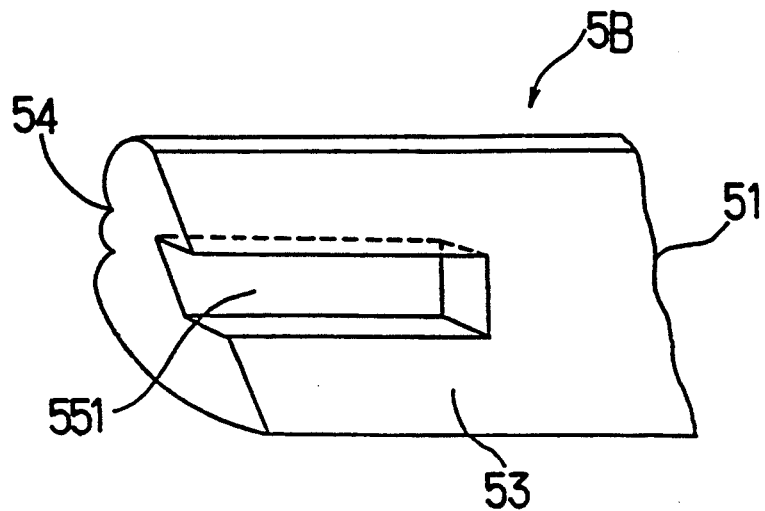
FIGS. 16 and 17 are related to Example 5 according to the present invention.

A molding strip according to another embodiment of the present invention is described below with reference to FIGS. 16 and 17.

Figure 17:
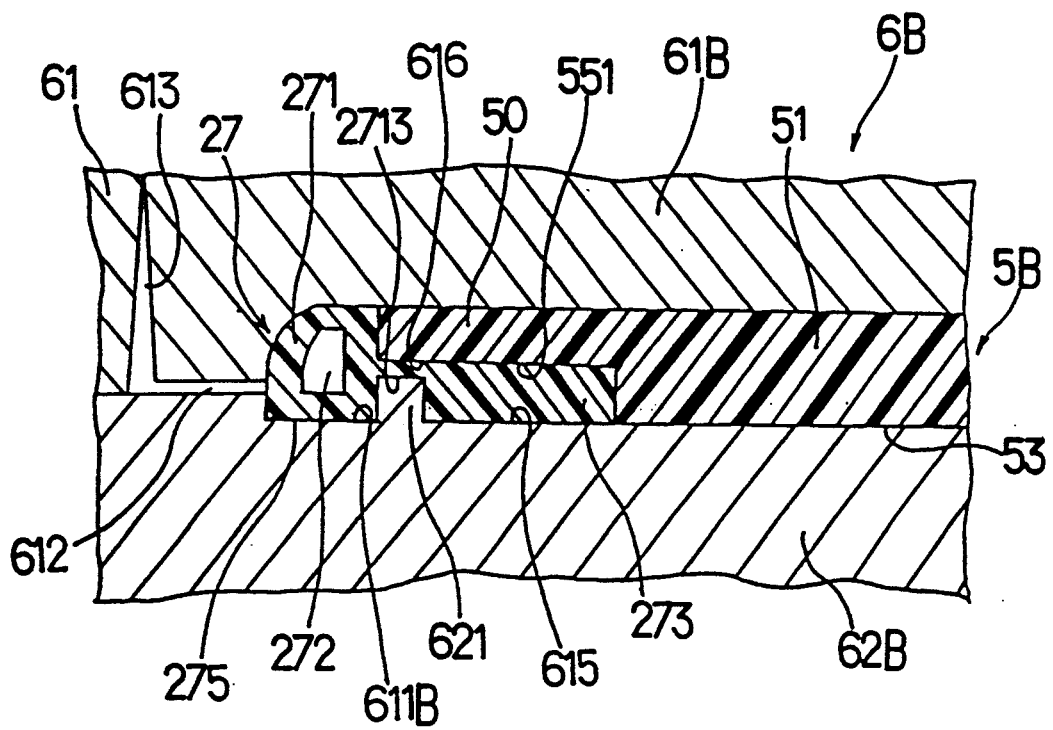

The molding strip described here is similar to that produced in Example 4, wherein the main frame 5A is replaced by a frame 5B having a predetermined length of open cutting 551 as shown in FIG. 17. In this case, the main frame 5B is obtained in advance by extrusion-molding polypropylene, as in the process described in Example 4. The other details are the same as those described in Example 4.

The process for molding the molding strip above includes placing the main frame 5B inside the cavity as shown in FIG. 17. A tub 615B is defined by the open cutting 551 provided at the lower part of the front end of the main frame 5B, the lower block 62B, and the protrusion 621. Then, in the same manner as in Example 3, the synthetic resin is injected into the cavity 611B inside the mold block, followed by the incorporation of nitrogen gas into the resin.

In this way an integrated molding strip is molded to include a main frame 5B and a front member 27 free from shrink marks and hesitation marks, bonded to the front end 50 of the main frame 5B (see FIG. 17). As seen from FIG. 17, the process according to the embodiment of the present invention enables a very tight bonding between the front end member 27 and the main frame 5B, inclusive of the bonding protrusion 273 in the integrated molding strip. The bonding protrusion 273 reinforces the bonding since it is fitted to the open cutting 55 of the main frame 5B and is further tightly bonded at the contact face. The front end member 27 further includes an end cap portion 271, a hollow cavity 272, and an attachment plane 275 by which the molding strip can be attached to an automobile body. The front end of the molding strip in this embodiment has between the front end member 27 and the bonding protrusion 273, a concave portion 2713 produced by the small flow path 616.

The same effect as in Example 3 is obtained by the process according to this embodiment of the present invention.

EXAMPLE 6

A molding strip according to another embodiment of the present invention is described below with reference to FIGS. 18 and 19.

Figure 18:
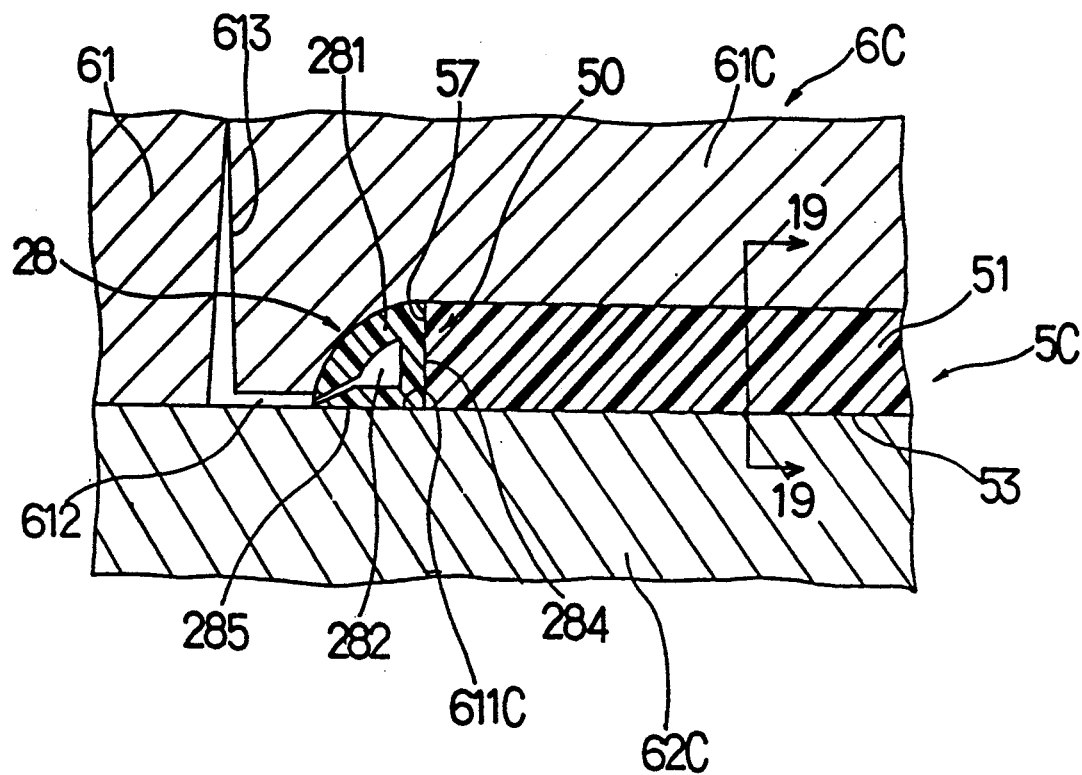
FIGS. 18 and 19 relate to Example 6 according to the present invention.

The molding strip described here according to another embodiment of the present invention is shown in FIG. 18, wherein the front end member 28 is bonded to the front end 50 of the main frame 5C by injection-molding.

The main frame 5C of the molding strip is a half barrel-shaped solid molding made of polyvinyl chloride, which is extrusion molded prior to the present process. The main frame 5C of the molding strip comprises a vertical plane 57 at the front end 50, as shown in FIG. 18.

The process according to this embodiment of the present invention comprises setting the main frame 5C of the molding strip inside the mold block 6C in such a manner that the front end 50 thereof define a cavity 611C together with the upper block 61C and the lower block 62C. Cavity 611C has the same shape as that of the front end member 28. Polyvinyl chloride and then nitrogen gas are injected into cavity 611C. These steps are carried out in the same manner as in Example 3.

In this case, the bonding face 284 of the front end member 28 and the vertical plane 57 of the main frame 5C of the molding strip are bonded simultaneously with the molding of the front end member 28, i.e., at the point the polyvinyl chloride is injected into the mold block 6C with the subsequent introduction of the nitrogen gas. The amount of the polyvinyl chloride injected into the mold block can be calculated by subtracting the volume of the hollow cavity 282 from that of the cavity 611.

The process according to this embodiment of the present invention finally provides an integrated molding strip in which the main frame 5C and the front end member 28 are tightly bonded to each other by the vertical plane 57 and the bonding face 284, as shown in FIG. 18.

Figure 19:
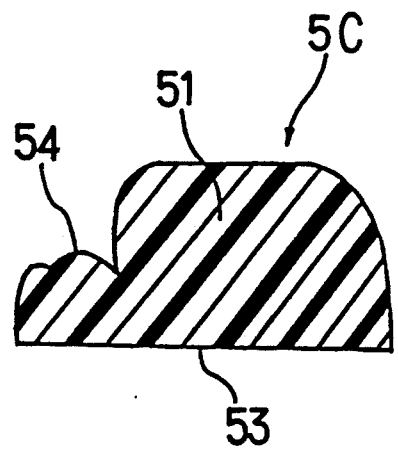

The front end member 28 in FIG. 18 has a hollow cavity 282 inside the end cap portion 281, and the main frame 5C of the molding strip shown in FIG. 19 comprises an upper ornamental edge 54 and an attachment plane 53 by which the molding strip is to be attached to an automobile body. These points are the same as in the molding strips described above in Examples 3 to 5.

Thus, the process according to the embodiment of the present invention as described above simply provides molding strips which can be conveniently attached to desired parts, and which have good appearance free from shrink marks.

From all of the foregoing it is clear that this invention includes many variations and embodiments. Others will be envisioned by those skilled in the art. However, it should be appreciated that the invention is not limited to the above disclosure but only by the scope of the following claims.

What is claimed is:

1. A method of molding a molding strip having a main frame and an end cap with a hollow portion therein, which comprises the steps of:

preparing said main frame of said molding strip so as to have a passage at a head portion thereof, while preparing a mold block so as to have a protrusion to form a small flow path by partially narrowing said passage;

disposing said main frame in said mold block so as to define a cavity for molding said end cap, said cavity being formed between the head portion of said main frame and said mold block;

injecting a molten synthetic resin into said cavity at least until a front end portion of said molten synthetic resin flow enters into said small flow path; and introducing a gas into said injected synthetic resin to thereby form said hollow portion, while simultaneously allowing a part of said injected synthetic resin to flow out from said cavity to said passage of said main frame through said small flow path.

2. The method as in claim 1, wherein said main frame of said molding strip provided with said passage longitudinally extending over the whole body thereof is prepared in advance by extrusion molding, and said mold block has means for closing said passage.

3. The method as in claim 2, wherein said main frame is in the form of a pipe.

4. The method as in claim 2, wherein said passage is in the form of a groove.

5. The method as in claim 1, wherein the small flow path has a diameter of from 0.3 to 2.5 mm.

6. The method as in claim 1, wherein the length of said small flow path between said mold cavity and said tub is from 0.5 to 10 mm.

7. The method as in claim 1, wherein said gas is one of nitrogen and air.

8. A method of molding a molding strip having a main frame including a passage provided at a head portion thereof, said strip having an end cap with a hollow portion therein, using in said method a mold block having a protrusion to form a small flow path by partially narrowing said passage, said method comprising the steps of:

disposing said main frame in said mold block so as to define a cavity for molding said end cap, which is formed between the head portion of said main frame and said mold block;

injecting a molten synthetic resin into said cavity at least until a front end portion of said molten synthetic resin flow enters into said small flow path; and introducing a gas into said injected synthetic resin to thereby form said hollow portion, including forcing an excess part of said injected synthetic resin out of said cavity to said passage of said main frame through said small flow path.

* * * * *

UNITED STATES PATENT AND TRADEMARK OFFICE
CERTIFICATE OF CORRECTION

PATENT NO. : 5,262,105
DATED : November 16, 1993
INVENTOR(S) : Komiyama et al

It is certified that error appears in the above-identified patent and that said Letters Patent is hereby corrected as shown below:

ON THE TITLE PAGE, ITEM [75]:

Please Delete

First and Second Inventors;  Chiaki Komiyama and Akiyoshi Nagano

Signed and Sealed this

Nineteenth Day of April, 1994

Attest:

BRUCE LEHMAN

Attesting Officer         Commissioner of Patents and Trademarks